(12) United States Patent
Shin et al.

(10) Patent No.: US 9,279,992 B2
(45) Date of Patent: Mar. 8, 2016

(54) APPARATUS FOR PROJECTING SPATIAL IMAGE

(71) Applicants: LG ELECTRONICS INC., Seoul (KR); Kwangwoon University Industry-Academic Collaboration Foundation, Seoul (KR)

(72) Inventors: Sungchul Shin, Seoul (KR); Eunsoo Kim, Seoul (KR); Seungcheol Kim, Seoul (KR); Bolam Kim, Seoul (KR)

(73) Assignees: LG ELECTRONICS INC., Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 259 days.

(21) Appl. No.: 14/104,745

(22) Filed: Dec. 12, 2013

(65) Prior Publication Data

US 2014/0192329 A1 Jul. 10, 2014

(30) Foreign Application Priority Data

Jan. 4, 2013 (KR) .................. 10-2013-0001220

(51) Int. Cl.
*G03B 21/28* (2006.01)
*G02B 27/22* (2006.01)
*H04N 9/31* (2006.01)
*G03B 35/20* (2006.01)
*G03B 37/04* (2006.01)
*H04N 13/04* (2006.01)

(52) U.S. Cl.
CPC ........ *G02B 27/2285* (2013.01); *G02B 27/2292* (2013.01); *G03B 35/20* (2013.01); *G03B 37/04* (2013.01); *H04N 9/3197* (2013.01); *H04N 13/0459* (2013.01); *H04N 13/0493* (2013.01)

(58) Field of Classification Search
CPC ... H04N 9/3185; H04N 9/3197; G03B 21/26; G03B 21/28; G06T 2207/10016; G02B 27/2292

See application file for complete search history.

(56) References Cited

U.S. PATENT DOCUMENTS 5,337,096 A * 8/1994 Qu .................. G03B 35/00
352/57
2012/0086915 A1* 4/2012 Rosen .................. G03B 21/26
353/30

* cited by examiner

*Primary Examiner* — Sultan Chowdhury
(74) *Attorney, Agent, or Firm* — Birch, Stewart, Kolasch & Birch, LLP (57) ABSTRACT

An apparatus for projecting a spatial image in which the spatial image with a background is projected into a space through a projection unit is discussed. The apparatus according to an embodiment includes a receiving unit to receive a spatial image and a background image, a display unit to display the spatial image and the background image and to project light, a control unit to control the display unit to display the spatial image and the background image, and a spatial image projection unit to project the spatial image and the background image by transmitting or reflecting the light. Thus, a spatial image may be viewed from every direction, and the spatial image may be projected to different positions according to images and a background image may be displayed at the same time. In addition, a user may perform interaction such as reaching of hands into the projected image.

20 Claims, 6 Drawing Sheets

APPARATUS FOR PROJECTING SPATIAL IMAGE

This application claims priority under 35 U.S.C. §119 to Korean Application No. 10-2013-0001220, filed in Korea on Jan. 4, 2013 which is hereby incorporated in its entirety by reference as if fully set forth herein.

BACKGROUND OF THE INVENTION

1. Field of the Invention

Embodiments of the present invention relate to an apparatus for projecting a spatial image, and more particularly, to an apparatus for projecting a spatial image in which the spatial image with a background is projected into a space through a projection unit.

2. Discussion of the Related Art

Unlike two-dimensional images, spatial images render depth. Humans can sense a three-dimensional effect when a spatial image is viewed through both eyes.

Apparatuses for projecting a spatial image provide viewers with a three-dimensional effect that has the same realism as a physical object, by projecting the spatial image.

The spatial image is projected by applying 3D display technologies using, for example, polarization, shutter glasses, parallax barrier, lenticular lenses, and the like, but these methods require a user to wear specially-designed glasses in order for the user to see the 3D images or provide a restricted viewing angle even if the glasses are not required.

Another method for projecting a spatial image is a volume method using a spinning screen, in which the 3D image can be viewed from every direction but the image cannot be touched since the image is present on a screen.

SUMMARY OF THE INVENTION

Accordingly, the embodiments of the present invention are directed to an apparatus for projecting a spatial image that substantially obviates one or more problems due to limitations and disadvantages of the related art.

An object of the present invention is to provide an apparatus and method for projecting a spatial image in which an image projected into a space may be viewed from every direction and the image can have a background.

Additional advantages, objects, and features of the embodiments of the present invention will be set forth in part in the description which follows and in part will become apparent to those having ordinary skill in the art upon examination of the following or may be learned from practice of the invention. The objectives and other advantages of the embodiments of the present invention may be realized and attained by the structure particularly pointed out in the written description and claims hereof as well as the appended drawings.

To achieve these objects and other advantages and in accordance with the purpose of the embodiments of the present invention, as embodied and broadly described herein, an apparatus for projecting a spatial image includes a receiving unit to receive a spatial image and a background image, a display unit to display the spatial image and the background image and to project light, a control unit to control the display unit to display the spatial image and the background image, and a spatial image projection unit to project the spatial image and the background image by transmitting or reflecting the light.

The display unit may include a first monitor arranged at a first side of the spatial image projection unit to display the spatial image and a second monitor arranged at a second side of the spatial image projection unit to display the background image.

The first monitor may be arranged a first distance from the spatial image projection unit, and the second monitor may be arranged a second distance from the spatial image projection unit, in which the first distance is greater than the second distance.

The spatial image displayed by the first monitor and the background image displayed by the second monitor may be simultaneously displayed.

The second monitor may be integrally coupled to the spatial image projection unit to contact each other.

The first monitor, the second monitor, and the spatial image projection unit may be arranged parallel to one another in a single row so as to overlap one another.

An area of the spatial image projection unit may be the same as display areas of the first and second monitors.

At least one of the first and second monitors may be linearly movable with respect to the spatial image projection unit.

The display unit may display the spatial image and the background image at different times.

The apparatus may further include a shutter unit disposed between first sides of the display unit and the spatial image projection unit and a screen arranged at a second side of the spatial image projection unit, wherein the shutter unit is opened to pass the spatial image according to a first control signal when the display unit displays the spatial image and is closed to block the background image according to a second control signal when the display unit displays the background unit.

The shutter unit may be a polymer dispersed liquid crystal (PDLC).

The screen may be arranged a first distance from the spatial image projection unit, and the shutter unit may be arranged a second distance from the spatial image projection unit, in which the first distance is greater than the second distance.

The shutter unit, the screen, and the spatial image projection unit may be arranged parallel to one another in a single row so as to overlap one another.

An area of at least one of the shutter unit and the screen may be the same as that of the spatial image projection unit.

The display unit may display the spatial image having a first polarization and the background image having a second polarization.

The apparatus may further include a second polarizer disposed between first sides of the display unit and the spatial image projection unit and a first polarizer arranged at a second side of the spatial image projection unit, wherein the second polarizer passes the spatial image having the first polarization and blocks the background image having the second polarization.

The first polarizer and the second polarizer may be polarization selective scattering films (PSSFs).

The first polarizer may be arranged a first distance from the spatial image projection unit, and the second polarizer may be arranged a second distance from the spatial image projection unit, wherein the first distance is greater than the second distance.

The spatial image projection unit may include any one of a convex lens, an array of convex lenses, a concave mirror, an array of concave mirrors, a concave lens, an array of concave lenses, and a transparent spherical body.

In another aspect of the present invention, an apparatus for projecting a spatial image includes a screen, a projection optical unit to alternately project, onto the screen, the spatial image at a first time and a background image at a second time, a spatial image projection unit disposed between the screen and the projection optical unit and reflecting the spatial image displayed on the screen to be projected into a predetermined space, and a shutter unit disposed between the projection optical unit and the spatial image projection unit, passing the spatial image projected by the projection optical unit at the first time, and blocking the background image projected by the projection optical unit at the second time.

In another aspect of the present invention, an apparatus for projecting a spatial image includes a first polarizer to block the spatial image having a first polarization, a second polarizer arranged at a distance from the first polarizer, passing the spatial image having the first polarization, and blocking a background image having a second polarization, a spatial image projection unit disposed between the first polarizer and the second polarizer and reflecting the spatial image blocked by the first polarizer to be projected into a predetermined space, a first projection optical unit to project the spatial image to the first polarizer at a first time, and a second projection optical unit to project the background image to the second polarizer at a second time, wherein the spatial image and the background image are alternately projected.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE EMBODIMENTS

Reference will now be made in detail to the example embodiments of the present invention, examples of which are illustrated in the accompanying drawings. Wherever possible, the same reference numbers will be used throughout the drawings to refer to the same or like parts.

In description of embodiments of the present invention, when a layer (film), an area, a pattern or structures are stated as being formed "on" or "under" a substrate, each layer (film), area, pad or pattern, it means that each layer (film), an area, a pattern or structures are formed "directly" or "by interposing another layer (indirectly)." A basis for "on" or "under" of each layer will be described with reference to the accompanying drawings.

Thicknesses and sizes of each layer may be exaggerated, omitted or schematically illustrated for the purpose of convenience and clarity of explanation. In addition, the size of each element does not necessarily reflect an actual size thereof.

Figure 1:
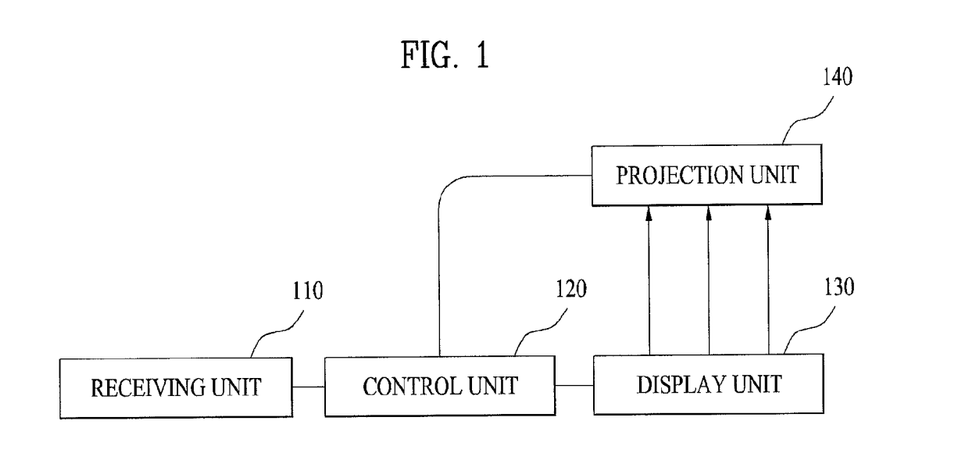
FIG. 1 is a block diagram illustrating an apparatus for projecting a spatial image.

FIG. 1 is a block diagram illustrating an apparatus for projecting a spatial image.

The apparatus for projecting a spatial image includes a receiving unit 110, a control unit 120, a display unit 130, and a projection unit 140.

The receiving unit 110 receives at least one of a spatial image and a background image from an external device. In this regard, the external device may be a device with a storage medium that stores the spatial image and the background image. The receiving unit 110 can additionally receive a projection position signal from the external device. The projection position signal may be a signal for controlling a motor that moves at least one of the display unit 130 and the projection unit 140, a signal for changing the state of the projection unit 140 having a liquid crystal lens or a liquid lens, or a signal for controlling a shutter installed in the projection unit 140.

The control unit 120 sends at least one of the spatial image and the background image to the display unit 130 and controls the display unit 130 to display the spatial image. Moreover, the control unit 120 controls operations of motors installed in the display unit 130 and the projection unit 140 or an operation of the projection unit 140 according to the projection position signal. The steps by which the control unit 120 controls each functional unit according to the projection position signal will be described below in detail with reference to FIGS. 9 to 12.

The display unit 130 displays at least one of the spatial image and the background image. In this regard, the display unit 130 may be a common flat-screen display, a parallax barrier display, a volume 3D display having a spinning screen, a stacked 3D display, an integral imaging based 3D display, or a hologram based 3D display. The display unit 130 may be other devices.

The projection unit 140 may be any one of a convex lens, an array of convex lenses, a concave mirror, an array of concave mirrors, a concave lens, an array of concave lenses, and a transparent spherical body. In addition, the projection unit 140 may refer to one or more liquid crystal lenses or liquid lenses. Moreover, the projection unit 140 may include one or more convex lenses, concave lenses and shutters. The projection unit 140 may be other devices. The projection unit 140 will be described below in detail according to different embodiments.

Figure 2:
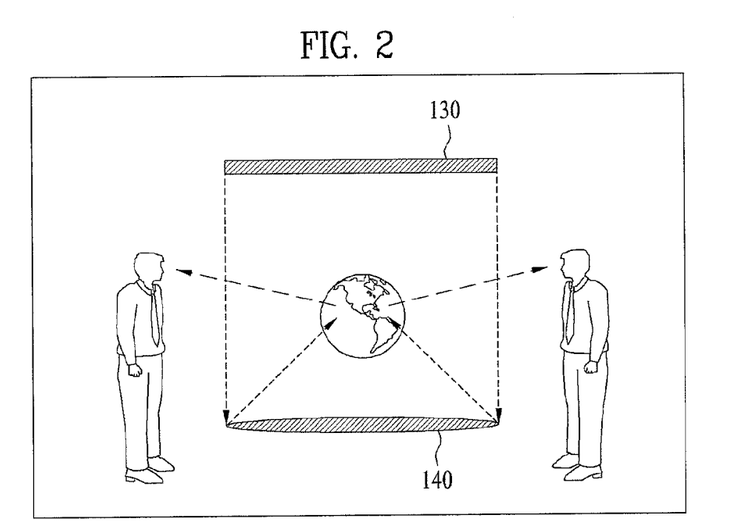
FIG. 2 is a view illustrating a display unit and a projection unit according to a first embodiment of the present invention.
Figure 3:
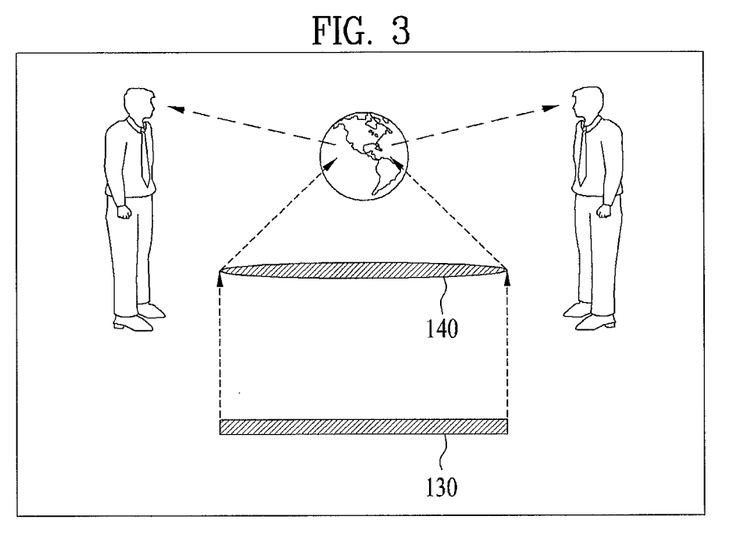
FIG. 3 is a view illustrating a display unit and a projection unit according to a second embodiment of the present invention.

FIG. 2 is a view illustrating a display unit and a projection unit according to a first embodiment of the present invention. FIG. 3 is a view illustrating a display unit and a projection unit according to a second embodiment of the present invention. In this regard, the projection unit 140 according to the first and second embodiments of the present invention is a convex lens.

Referring to FIG. 2, the display unit 130 displays the spatial image and projects light from an upper side to a lower side. The projection unit 140, which is a convex lens, reflects the light projected by the display unit 130 and projects the spatial image into a space between the display unit 130 and the projection unit 140. In this regard, the positions of the display unit 130 and the projection unit 140 in accordance with the first embodiment may be reversed. In other words, the display unit 130 may display the spatial image and project the light from the lower side to the upper side, and the projection unit 140, which is a convex lens, may project the spatial image into a space between the display unit 130 and the projection unit 140 by reflecting the light projected by the display unit 130.

Referring to FIG. 3, the display unit 130 that is positioned below the projection unit 140 displays the spatial image and projects light to the projection unit 140. In this regard, the projection unit 140 may project the light received from the display unit 130 into a space above the projection unit 140.

In this regard, the convex lens according to the first embodiment of the present invention may have a greater reflectivity than the convex lens according to the second embodiment of the present invention. That is, the convex lens according to the second embodiment of the present invention may have a greater transmissivity than the convex lens according to the first embodiment of the present invention. In addition, although the first and second embodiments of the present invention illustrate the projection unit 140 as a single convex lens, the projection unit 140 may be arranged as an array of convex lenses including a plurality of convex lenses.

As illustrated in FIGS. 2 and 3, the apparatuses for projecting a spatial image may project the spatial image using various projection units 140.

FIGS. 2 and 3 illustrate display units, both of which display a two-dimensional image, by way of example. When a display unit capable of rendering a volume (hereinafter referred to as a volume display unit) is used, however, a spatial image rendering the volume of a projected image may be projected. The volume display unit may be a volume 3D display having a spinning screen, a stacked 3D display, an integral imaging based 3D display, a hologram based 3D display, or the like.

Figure 4A:
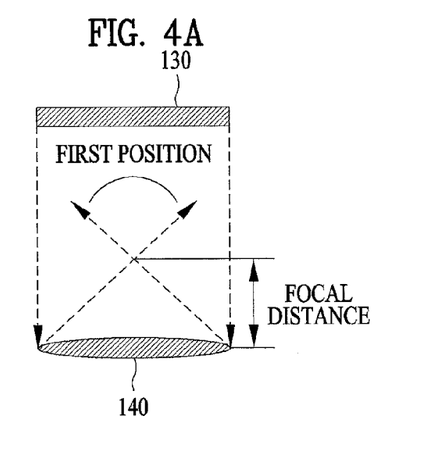
FIGS. 4A to 4C are views illustrating some examples of locations where the spatial image is projected using a volume display unit of the apparatus for projecting a spatial image.
Figure 4B:
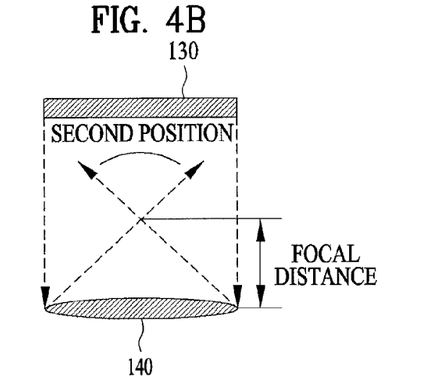
Figure 4C:
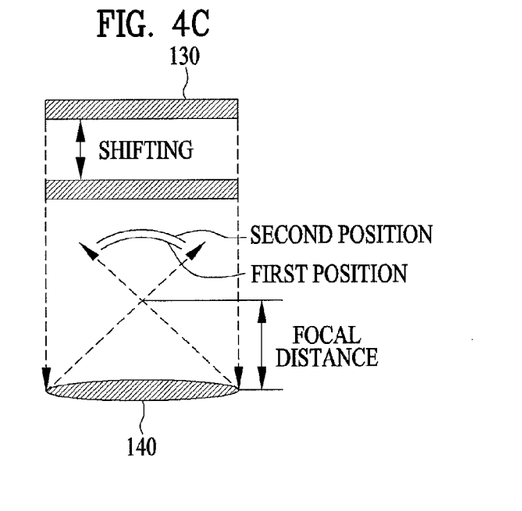

FIGS. 4A to 4C are views illustrating some examples of locations where the spatial image is projected using a volume display unit of the apparatus for projecting a spatial image. Hereinafter, it will be assumed that the display unit 130 is a volume display unit.

FIG. 4A illustrates a location where the spatial image is projected (hereinafter referred to as a first spatial image location) when the display unit 130 is placed at a first position. FIG. 4B illustrates a location where the spatial image is projected (hereinafter referred to as a second spatial image location) when the display unit 130 is placed at a second position that is closer to a lens than the first position. The first spatial image location is farther away from the projection unit 140 than the second spatial image location. In other words, as illustrated in FIG. 4C, the closer the display unit 130 is to the projection unit 140, the farther the spatial image may be projected from the lens (e.g., the projection unit 140).

Accordingly, the apparatus for projecting a spatial image may include a motor capable of shifting the position of the display unit 130, and the control unit 120 may receive the projection position signal from the receiving unit 110 and control the motor according to the projection position signal to change the position of the display unit 130. For example, in the instance that the display unit 130 is placed at the first position, the control unit 120 may receive the projection position signal and shift the position of the display unit 130 to the second position according to the projection position signal. As a result, the apparatus for projecting a spatial image may smoothly shift the depth of the spatial image by shifting the location where the spatial image is projected.

Figure 5:
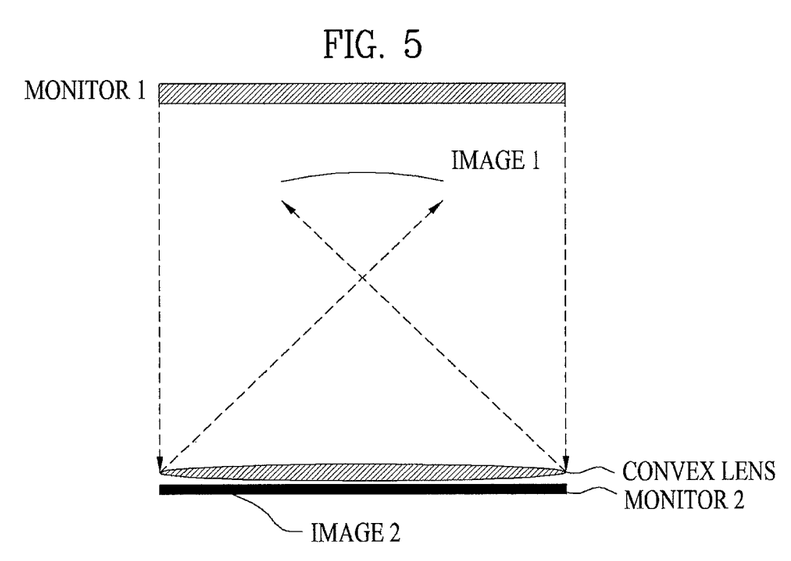
FIG. 5 is a view of a display unit and a projection unit of an apparatus for projecting a spatial image according to a third embodiment of the present invention.

FIG. 5 is a view of an apparatus for projecting a spatial image with a background according to a third embodiment of the present invention.

Referring to FIG. 5, the apparatus for projecting a spatial image with a background according to the third embodiment of the present invention includes the same elements as those of the apparatus for projecting a spatial image according to the first embodiment of the present invention, except that the apparatus of FIG. 5 may further include a display unit for displaying a background image below a spatial image projection unit including a floating lens or a convex lens. Thus, the image from an upper display unit may be projected into a space as in the first embodiment. In this regard, when a lower display unit displays a background image, the image projected into a space with the background image disposed therebelow is displayed.

In an embodiment, as illustrated in FIG. 5, a first monitor displaying a spatial image may be installed at a first side of the spatial image projection unit including a floating lens or a convex lens, and a second monitor displaying a background image may be installed at a second side of the spatial image projection unit.

In this regard, the first monitor may be arranged a first distance from the spatial image projection unit, the second monitor may be arranged a second distance from the spatial image projection unit, and the first distance may be greater than the second distance.

In addition, the spatial image displayed on the first monitor and the background image displayed on the second monitor may be simultaneously displayed.

In some embodiments, the spatial image displayed on the first monitor and the background image displayed on the second monitor may be displayed at different times.

That is, the spatial image displayed on the first monitor and the background image displayed on the second monitor may be alternately displayed. By alternately displaying the spatial image and the background image at a high frequency, an observer may observe the image projected into a space and the background image at the same time.

In addition, in another embodiment, the second monitor may contact the spatial image projection unit.

In another embodiment, the second monitor and the spatial image projection unit may be integrally coupled to each other.

As such, when the second monitor and the spatial image projection unit are integrally fabricated, an installation space of the apparatus for projecting a spatial image may be reduced.

In addition, the first and second monitors and the spatial image projection unit may be arranged parallel to one another in a single row so as to overlap one another.

In this regard, the first and second monitors and the spatial image projection unit may completely overlap one another. In some embodiments, the first and second monitors and the spatial image projection unit may partially overlap one another.

In addition, the area of the spatial image projection unit may be the same as display areas of the first and second monitors.

In some embodiments, the area of the spatial image projection unit may be greater than display areas of the first and second monitors.

This is because, when the area of the spatial image projection unit is smaller than the display areas of the first and second monitors, only a portion of the entire spatial image is projected into a space.

In addition, at least one of the first and second monitors may be linearly movable with respect to the spatial image projection unit.

For example, at least one of the first and second monitors may be movable so as to decrease the distance from the spatial image projection unit or movable so as to increase the distance from the spatial image projection unit.

This is because the position of the spatial image moves upward or downward due to linear movement of the first and second monitors, and thus, the location where the spatial image is projected may be accurately adjusted to a desired position and a focal distance of the spatial image may be accurately adjusted, whereby a clear, realistic spatial image may be provided.

In some embodiments, at least one of the first and second monitors may be rotatably movable about a predetermined rotational axis.

This is because the position of the spatial image moves leftward or rightward due to rotational motion of the first and second monitors, and thus, the location where the spatial image is projected may be accurately adjusted to a desired position and a focal distance of the spatial image may be accurately adjusted, whereby a clear, realistic spatial image may be provided.

Figure 6:
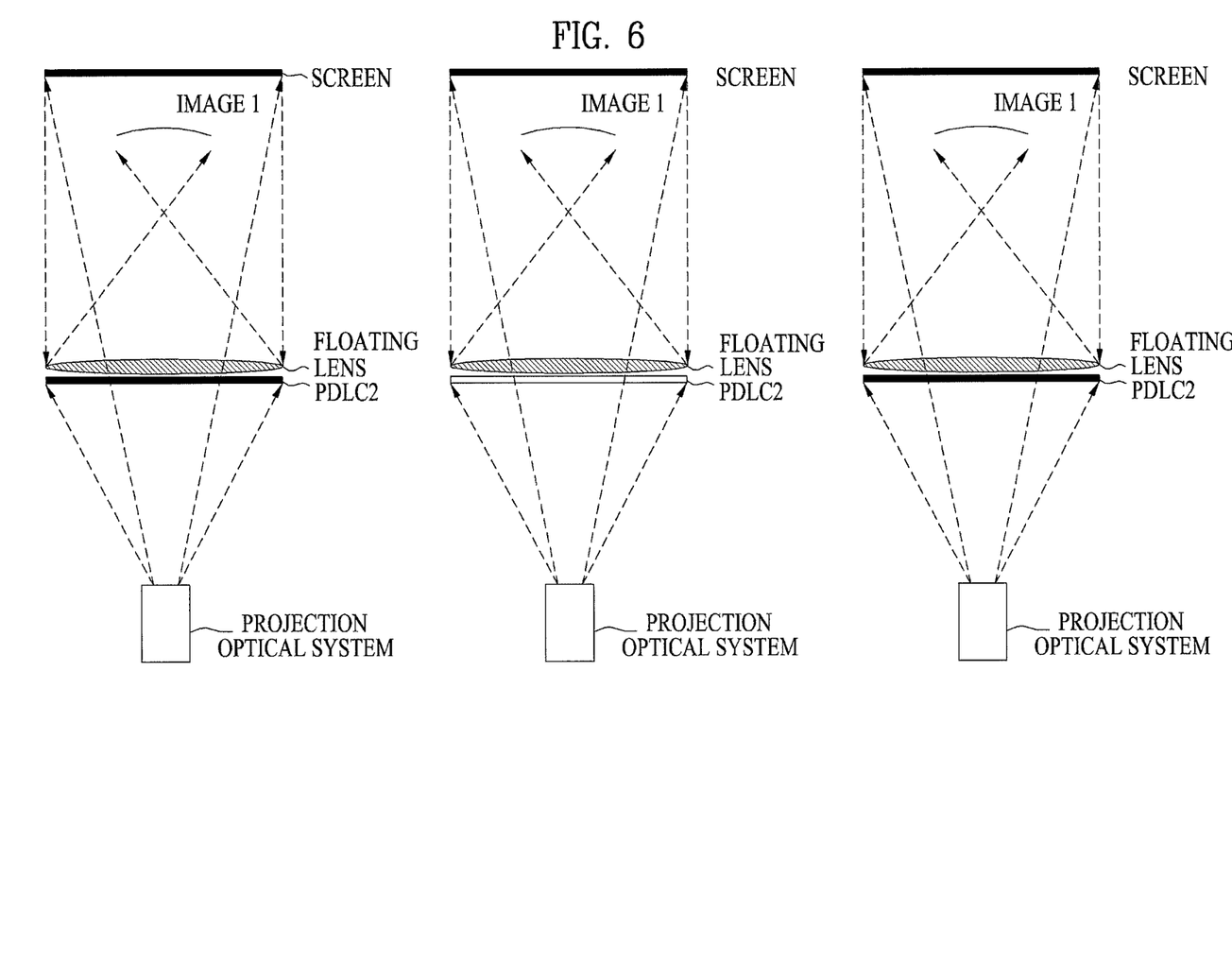
FIG. 6 is a view of a display unit and a projection unit of an apparatus for projecting a spatial image according to a fourth embodiment of the present invention.

FIG. 6 is a view of an apparatus for projecting a spatial image with a background according to a fourth embodiment of the present invention.

Referring to FIG. 6, the apparatus for projecting a spatial image with a background according to the fourth embodiment of the present invention includes a spatial image projection unit including a floating lens, a display unit including a projection optical system, a shutter unit including polymer dispersed liquid crystal (PDLC), and a screen. In this regard, the PDLC refers to a device that is turned on/off according to driving of a power supply.

First, the PDLC turns transparent when a power supply is driven and an image from the projection optical system passes through the PDLC, thereby being projected onto the screen. In addition, the image projected onto the screen may be projected into a space as in the first embodiment.

In addition, when the PDLC is opaque since power is not applied thereto, the image from the projection optical system is formed on the PDLC. Thus, the image corresponds to a lower display image and thus serves as a background image.

In this regard, when application and non-application of power to the PDLC are repeated at a high rate, the space projection image and the background image may be viewed at the same time.

In an embodiment, more particularly, as illustrated in FIG. 6, the display unit including a projection optical system may display the spatial image and the background image at different times.

In this regard, the shutter unit may be disposed between first sides of the display unit including a projection optical system and the spatial image projection unit including a floating lens or a convex lens, and the screen may be arranged at a second side of the spatial image projection unit.

In addition, when the display unit displays the spatial image, the shutter unit may be opened and pass the spatial image therethrough according to a first control signal. On the other hand, when the display unit displays the background image, the shutter unit may be closed and block the background image according to a second control signal.

In this regard, the shutter unit may be PDLC.

In addition, the screen may be arranged a first distance from the spatial image projection unit, the shutter unit may be arranged a second distance from the spatial image projection unit, and the first distance may be greater than the second distance.

Thus, when the projection optical system repetitively projects the spatial image and the background image in alternating order at a high rate and the shutter unit is opened so as to pass only the spatial image therethrough and blocks the background image in synchronization with the rate, an observer may view the space projection image together with the background image.

In addition, in another embodiment, the shutter unit may contact the spatial image projection unit.

In another embodiment, the shutter unit and the spatial image projection unit may be integrally coupled to each other.

As such, when the shutter unit and the spatial image projection unit are integrally fabricated, an installation space of the apparatus for projecting a spatial image may be reduced.

In addition, the shutter unit, the screen, and the spatial image projection unit may be arranged parallel to one another in a single row so as to overlap one another.

In this regard, the shutter unit, the screen, and the spatial image projection unit may completely overlap one another. In some embodiments, the shutter unit, the screen, and the spatial image projection unit may partially overlap one another.

In addition, the area of the spatial image projection unit may be the same as an area of at least one of the shutter unit and the screen.

In some embodiments, the area of the spatial image projection unit may be greater than the area of at least one of the shutter unit and the screen.

This is because, when the area of the spatial image projection unit is smaller than the areas of the shutter unit and the screen, only a portion of the entire spatial image is projected into a space.

In addition, the screen may be linearly movable towards the spatial image projection unit.

For example, the screen may be movable so as to decrease the distance from the spatial image projection unit or movable so as to increase the distance from the spatial image projection unit.

This is because the position of the spatial image moves upward or downward due to linear movement of the screen, and thus, the location where the spatial image is projected may be accurately adjusted to a desired position and a focal distance of the spatial image may be accurately adjusted, whereby a clear, realistic spatial image may be provided.

In some embodiments, the screen may be rotatably movable about a predetermined rotational axis.

This is because the position of the spatial image moves leftward or rightward due to rotational motion of the screen, and thus, the location where the spatial image is projected may be accurately adjusted to a desired position and a focal distance of the spatial image may be accurately adjusted, whereby a clear, realistic spatial image may be provided.

Thus, the apparatus for projecting a spatial image illustrated in FIG. 6 may include the screen, a projection optical unit for alternately projecting, onto the screen, the spatial image at a first time and the background image at a second time, the spatial image projection unit disposed between the screen and the projection optical unit and reflecting the spatial image displayed on the screen to be projected into a predetermined space, and the shutter unit that is disposed between the projection optical unit and the spatial image projection unit, passes the spatial image projected by the projection optical unit at the first time therethrough, and blocks the background image projected by the projection optical unit at the second time.

Figure 7:
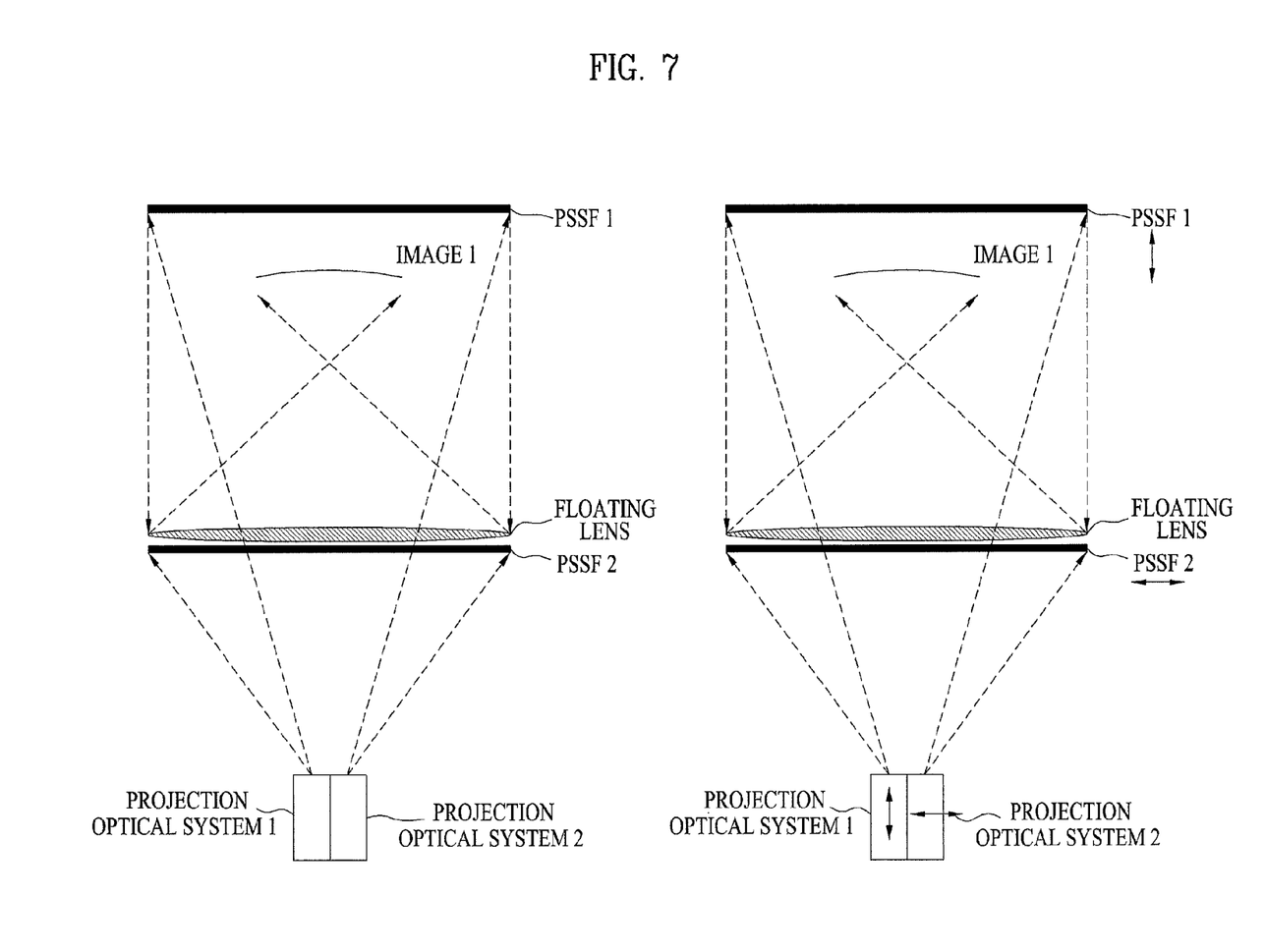
FIG. 7 is a view of a display unit and a projection unit of an apparatus for projecting a spatial image according to a fifth embodiment of the present invention.

FIG. 7 is a view illustrating an apparatus for projecting a spatial image with a background according to a fifth embodiment of the present invention.

Referring to FIG. 7, the apparatus for projecting a spatial image with a background according to the fifth embodiment of the present invention includes a projection optical system having a polarization state perpendicular to that of a floating lens and polarization selective scattering films (PSSFs) fixed in a state of polarization perpendicular to each other. In this regard, the PSSFs refer to devices for transmitting or scattering light according to polarization properties thereof.

First, an image from a projection optical system 1 for projecting vertically polarized light passes through a PSSF2 because the PSSF2 has a different polarization direction than the projection optical system 1. In addition, the image continuously proceeds and is scattered from a PSSF1 because the PSSF1 has the same polarization direction as the projection optical system 1. Thereafter, the scattered image is projected into a space as in the first embodiment. Simultaneously, an image from a projection optical system 2 for projecting horizontally polarized light is projected through the PSSF2 because the PSSF2 has the same polarization direction as the projection optical system 2 and serves as a background image.

As such, the projection optical systems that produce images having different polarization directions may consist of two projection optical systems. In another embodiment, a single projection optical system for projecting images at a high rate such that the images and polarization coincide with each other using a polarization switch disposed in front of the projection optical system may be used.

In one embodiment, more particularly, as illustrated in FIG. 7, the display unit, which is a projection optical system, may display a spatial image having a first polarization and a background image having a second polarization.

In this regard, a second polarizer may be disposed between first sides of the display unit, which is a projection optical system, and the spatial image projection unit including a floating lens or a convex lens, and a first polarizer may be arranged at a second side of the spatial image projection unit. The second polarizer may pass the spatial image having the first polarization therethrough and block the background image having the second polarization.

In this regard, the first polarizer and the second polarizer may be PSSFs.

In addition, the first polarizer may be arranged a first distance from the spatial image projection unit, the second polarizer may be arranged a second distance from the spatial image projection unit, and the first distance may be greater than the second distance.

In addition, the spatial image projection unit may include any one of a convex lens, an array of convex lenses, a concave mirror, an array of concave mirrors, a concave lens, an array of concave lenses, and a transparent spherical body. The special image projection unit may include other devices.

In this regard, the display unit may be a single projection optical system capable of alternately displaying the spatial image having the first polarization and the background image having the second polarization or may include two projection optical systems consisting of a first projection optical system for displaying only the spatial image having the first polarization and a second projection optical system for displaying only the background image having the second polarization.

When the display unit is configured as a single projection optical system, the display unit may alternately display the spatial image having the first polarization and the background image having the second polarization at a high rate, and the spatial image having the first polarization may pass through the second polarizer having the same polarization direction as the spatial image and then be projected into the space by the first polarizer having a different polarization direction than the second polarizer.

In addition, the background image having the second polarization is blocked by the second polarizer having a different polarization direction than the background image and is displayed on the second polarizer, and thus, an observer may view the space projection image together with the background image.

In addition, when the display unit consists of two projection optical systems, the first projection optical system may display only the spatial image having the first polarization, the second projection optical system may display only the background image having the second polarization, and the spatial image having the first polarization may pass through the second polarizer having the same polarization direction as the spatial image and then be projected into a space by the first polarizer having a different polarization direction than the second polarizer.

In addition, the background image having the second polarization is blocked by the second polarizer having a different polarization direction as the background image and is displayed on the second polarizer, and thus, an observer may view the space projection image together with the background image.

In addition, in another embodiment, the second polarizer may contact the spatial image projection unit.

In some embodiments, the second polarizer and the spatial image projection unit may be integrally coupled to each other.

As such, when the second polarizer and the spatial image projection unit are integrally fabricated, an installation space of the apparatus for projecting a spatial image may be reduced.

The first polarizer, the second polarizer, and the spatial image projection unit may be arranged parallel to one another in a single row so as to overlap one another.

In this regard, the first polarizer, the second polarizer, and the spatial image projection unit may completely overlap one another. In some embodiments, the first polarizer, the second polarizer, and the spatial image projection unit may partially overlap one another.

In addition, the area of the spatial image projection unit may be the same as areas of the first polarizer and the second polarizer.

In some embodiments, the area of the spatial image projection unit may be greater than the areas of the first polarizer and the second polarizer.

This is because, when the area of the spatial image projection unit is smaller than the areas of the first polarizer and the second polarizer, only a portion of the entire spatial image is projected into a space.

In addition, at least one of the first polarizer and the second polarizer may be linearly movable with respect to the spatial image projection unit.

For example, at least one of the first polarizer and the second polarizer may be movable so as to decrease the distance from the spatial image projection unit or movable so as to increase the distance from the spatial image projection unit.

This is because the position of the spatial image moves upward or downward due to a linear movement of the first polarizer and the second polarizer, and thus, the location where the spatial image is projected may be accurately adjusted to a desired position and a focal distance of the spatial image may be accurately adjusted, whereby a clear, realistic spatial image may be provided.

In some embodiments, at least one of the first polarizer and the second polarizer may be rotatably movable about a predetermined rotational axis.

This is because the position of the spatial image moves leftward or rightward due to a rotational motion of the first polarizer and the second polarizer, and thus, the location where the spatial image is projected may be accurately adjusted to a desired position and a focal distance of the spatial image may be accurately adjusted, whereby a clear, realistic spatial image may be provided.

Thus, the apparatus for projecting a spatial image illustrated in FIG. 7 includes the first polarizer for blocking the spatial image having the first polarization, the second polarizer that is disposed a constant distance from the first polarizer, passes the spatial image having the first polarization therethrough, and blocks the background image having the second polarization, the spatial image projection unit that is disposed between the first polarizer and the second polarizer and reflects the spatial image blocked by the first polarizer to be projected into a predetermined space, the first projection optical unit for projecting the spatial image to the first polarizer at a first time, and the second projection optical unit for projecting the background image to the second polarizer at a second time. In this regard, the spatial image and the background image may be alternately projected.

Thus, according to embodiments of the present invention, a spatial image may be viewed from every direction, and the spatial image may be projected to different positions according to images and a background image may be displayed at the same time. In addition, a user may perform an interaction such as reaching of hands into the projected image, and the like.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for projecting a spatial image, the apparatus comprising:
   a receiving unit to receive a spatial image and a background image;
   a display unit to display the spatial image and the background image and to project light;
   a control unit to control the display unit to display the spatial image and the background image; and
   a spatial image projection unit to project the spatial image and the background image by transmitting or reflecting the light.

2. The apparatus according to claim 1, wherein the display unit comprises:
   a first monitor arranged at a first side of the spatial image projection unit to display the spatial image; and
   a second monitor arranged at a second side of the spatial image projection unit to display the background image.

3. The apparatus according to claim 2, wherein the first monitor is arranged a first distance from the spatial image projection unit, and the second monitor is arranged a second distance from the spatial image projection unit, the first distance being greater than the second distance.

4. The apparatus according to claim 2, wherein the spatial image displayed by the first monitor and the background image displayed by the second monitor are simultaneously displayed.

5. The apparatus according to claim 2, wherein the second monitor is integrally coupled to the spatial image projection unit to contact each other.

6. The apparatus according to claim 2, wherein the first monitor, the second monitor, and the spatial image projection unit are arranged parallel to one another in a single row so as to overlap one another.

7. The apparatus according to claim 2, wherein an area of the spatial image projection unit is the same as display areas of the first and second monitors.

8. The apparatus according to claim 2, wherein at least one of the first and second monitors is linearly movable with respect to the spatial image projection unit.

9. The apparatus according to claim 1, wherein the display unit displays the spatial image and the background image at different times.

10. The apparatus according to claim 9, further comprising:
    a shutter unit disposed between first sides of the display unit and the spatial image projection unit; and
    a screen arranged at a second side of the spatial image projection unit,
    wherein the shutter unit is opened to pass the spatial image according to a first control signal when the display unit displays the spatial image and is closed to block the background image according to a second control signal when the display unit displays the background unit.

11. The apparatus according to claim 10, wherein the shutter unit is a polymer dispersed liquid crystal (PDLC).

12. The apparatus according to claim 10, wherein the screen is arranged a first distance from the spatial image projection unit, and the shutter unit is arranged a second distance from the spatial image projection unit, the first distance being greater than the second distance.

13. The apparatus according to claim 10, wherein the shutter unit, the screen, and the spatial image projection unit are arranged parallel to one another in a single row so as to overlap one another.

14. The apparatus according to claim 10, wherein an area of at least one of the shutter unit and the screen is the same as that of the spatial image projection unit.

15. The apparatus according to claim 1, wherein the display unit displays the spatial image having a first polarization and the background image having a second polarization.

16. The apparatus according to claim 15, further comprising:
    a second polarizer disposed between first sides of the display unit and the spatial image projection unit; and
    a first polarizer arranged at a second side of the spatial image projection unit,
    wherein the second polarizer passes the spatial image having the first polarization and blocks the background image having the second polarization.

17. The apparatus according to claim 16, wherein the first polarizer and the second polarizer are polarization selective scattering films (PSSFs).

18. The apparatus according to claim 16, wherein the first polarizer is arranged a first distance from the spatial image projection unit, and the second polarizer is arranged a second distance from the spatial image projection unit, the first distance being greater than the second distance.

19. An apparatus for projecting a spatial image, the apparatus comprising:
    a screen;
    a projection optical unit to alternately project, onto the screen, the spatial image at a first time and a background image at a second time;

a spatial image projection unit disposed between the screen and the projection optical unit and reflecting the spatial image displayed on the screen to be projected into a predetermined space; and a shutter unit disposed between the projection optical unit and the spatial image projection unit, passing the spatial image projected by the projection optical unit at the first time, and blocking the background image projected by the projection optical unit at the second time.

20. An apparatus for projecting a spatial image, the apparatus comprising:

a first polarizer to block the spatial image having a first polarization;

a second polarizer arranged at a distance from the first polarizer, passing the spatial image having the first polarization, and blocking a background image having a second polarization;

a spatial image projection unit disposed between the first polarizer and the second polarizer and reflecting the spatial image blocked by the first polarizer to be projected into a predetermined space;

a first projection optical unit to project the spatial image to the first polarizer at a first time; and a second projection optical unit to project the background image to the second polarizer at a second time, wherein the spatial image and the background image are alternately projected.

* * * * *